(12) United States Patent
Apostolopoulos

(10) Patent No.: US 6,611,530 B1
(45) Date of Patent: Aug. 26, 2003

(54) VIDEO COMMUNICATION USING MULTIPLE STREAMS

(75) Inventor: John G. Apostolopoulos, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/400,416

(22) Filed: Sep. 21, 1999

(51) Int. Cl.[7] .................................................. H04N 7/26
(52) U.S. Cl. ...................... 370/442; 370/487; 348/443; 348/512
(58) Field of Search ................................. 370/442, 487; 375/240.12, 240.14; 348/443, 512; 709/246

(56) References Cited

U.S. PATENT DOCUMENTS

| | | | | |
|---|---|---|---|---|
| 5,481,542 A | * | 1/1996 | Logston et al. ............. | 370/442 |
| 5,646,687 A | * | 7/1997 | Botsford, III et al. .. | 375/240.12 |
| 5,706,053 A | | 1/1998 | Urano ........................ | 348/401 |
| 5,727,088 A | | 3/1998 | Kim ............................ | 382/238 |
| 5,805,225 A | * | 9/1998 | Tahara et al. .......... | 375/240.14 |
| 6,101,591 A | * | 8/2000 | Foster et al. ................ | 348/512 |
| 6,226,038 B1 | * | 5/2001 | Frink et al. .................. | 348/443 |
| 6,317,795 B1 | * | 11/2001 | Malkin et al. .............. | 709/246 |

FOREIGN PATENT DOCUMENTS

| | | |
|---|---|---|
| EP | 616472 | 9/1994 |
| EP | 720386 | 3/1996 |

OTHER PUBLICATIONS

IEEE Magazine, 6/98, Extensions of ITU–T, Recommendation H.324 for Error–Resilient Video Transmission, Niko Farber, et al.

IEEE Magazine 1997, p. 419–424, Multiple Description Image Coding for Noisy Channels By Paring Transforming Coefficients.

Proceedings of Globecom, vol 3, pp 1503–1508, Nov. 1996, Error Resilient Video Coding By Dynamic Replacing of Reference Pictures.

IEEE 1997, Eckehard Steinbach et al, Standard Compatible Extension of H.263 for Robust Video Transmission in Mobil Environments.

Motion Analysis and Image Sequence Processing, chapter 15, 1993, Video Compression for Digital Advanced Television Systems. J. Apostolopoulos, et al.

IEEE Communications Magazine 6/96, Error–Resilient Video Coding in the ISO MPEG–4 Standard, Raj Talluri.

Proceedings of IEEEinter. Cont. on Image Processing, vol III, pp763–766, Sep. 1996, Adaptive Intra Update for Video Coding Over Noisy Channels, Judy Y. Liao, et al.

IEEE Transactions on Circuits and Systems for Video Technology, vol 6, no Dec. 1996, Low Bit–Rate Video Transmission Over Fading Channels for Wireless Microcellular Systems.

* cited by examiner

*Primary Examiner*—Salvatore Cangialosi

(57) ABSTRACT

A video communication system that uses multiple streams to carry digital video. The use of multiple streams ensures that errors in one or more of the multiple streams do not prevent reconstruction of remaining ones of the multiple streams. This enables an error free display of the digital video at a reduced frame rate during the loss of a subset of the streams. In addition, the multiple streams provide past and future frames that may be used to recover lost frames and thereby recover the lost stream.

17 Claims, 5 Drawing Sheets

VIDEO COMMUNICATION USING MULTIPLE STREAMS

BACKGROUND OF THE INVENTION

1. Field of Invention

The present invention pertains to the field of video communication. More particularly, this invention relates to video communication using multiple encoded streams.

2. Art Background

A wide variety of video communication systems including digital television systems, Internet video systems, and wireless video systems commonly employ communication links to carry digital video. Typically in such systems, a digital video originates in a sender and is transferred to one or more receivers via one or more communication links. In a digital television system, for example, a broadcast station as a sender usually transmits digital video to one or more digital television receivers via over-the-air or cable communication links. In an Internet video system, as another example, a web server typically acts as a sender that transfers digital video to one or more web client receivers via the Internet.

Digital video in such systems is typically arranged as a series of video frames. The video frames usually occur at high enough frame rate to enable a viewer to perceive full motion video when the video frames are rendered on a display. For example, a frame rate between 15 and 30 frames per second is common in video communication systems. Each video frame usually carries an array of pixel data. The relatively high amount of pixel data contained in each video frame combined with a frame rate high enough to provide full motion video would typically impose a relatively high bandwidth consumption on a communication link.

Prior video communication systems commonly employ video compression to reduce the bandwidth consumption of digital video. Typically, a sender includes an encoder that generates a series of encoded frames in response to a series of original video frames. Each receiver usually includes a decoder which reconstructs the original series of video frames from the encoded frames. The total amount of data carried in the encoded frames is usually significantly less than the total amount of data in the corresponding original video frames.

The encoded frames in prior video compression methods typically include frames which carry all of the information needed to reconstruct the corresponding original video frame. Such frames may be referred to as intra frames (I-frames). In addition, the encoded frames in prior video compression methods typically include frames for which reconstruction of the corresponding original video frame depends on a prior encoded frame from the series of encoded frames. Such frames may be referred to as predicted frames (P-frames) because they are commonly generated by an encoder using a prediction loop.

Typically, the amount of data carried in an I-frame is significantly greater than the amount of data carried in a P-frame. Therefore, bandwidth savings is usually enhanced if a greater percentage of the encoded frames are P-frames. Unfortunately, when using prediction the loss of a P-frame or I-frame during transmission typically prevents the reconstruction of the corresponding original video frame as well as the reconstruction of a sequence of subsequent P-frames before a next I-frame. The loss of a sequence of P-frames usually has negative effects on the reconstructed digital video. Such effects may result in freeze frame or the appearance of displayed artifacts. These negative effects are typically worsened in systems which use a relatively large number of P-frames between I-frames due to communication bandwidth constraints.

SUMMARY OF THE INVENTION

A video communication system is disclosed that uses multiple streams to carry digital video. The use of multiple streams ensures that errors in one or more of the multiple streams do not prevent reconstruction of remaining ones of the multiple streams. This enables an error free display of the digital video at a reduced frame rate during the loss of a subset of the streams. In addition, the multiple streams provide past and future frames that may be used to recover lost frames.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
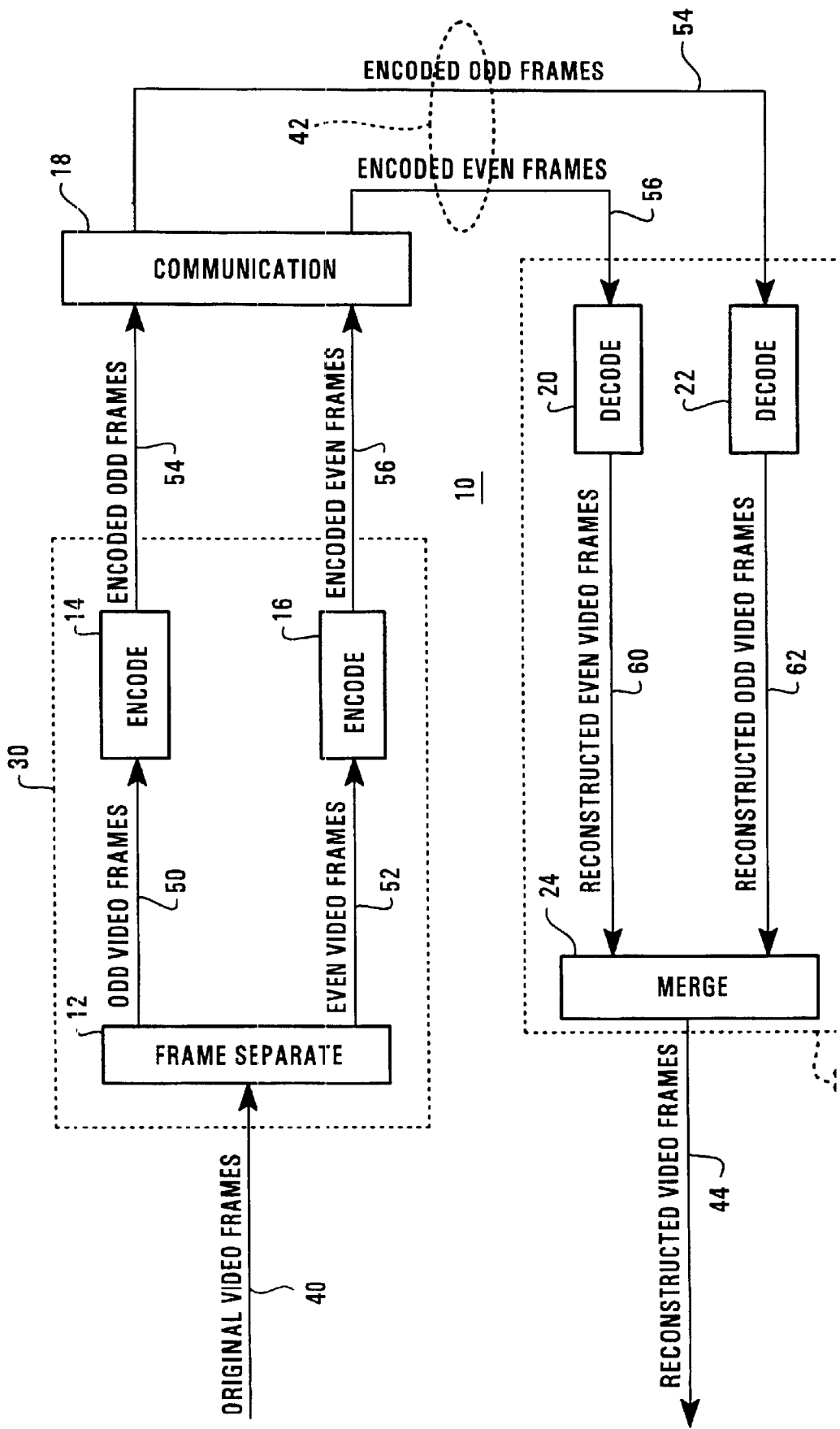
FIG. 1 illustrates a video communication system according to the present teachings.

FIG. 1 illustrates a video communication system 10 according to the present teachings. The video communication system 10 includes a sender 30 that communicates a series of original video frames 40 to a receiver 32 using a set of streams 42. In this embodiment, the streams 42 include a pair of streams 54 and 56 which carry encoded odd and even frames, respectively, from the original video frames 40.

In this embodiment, the sender 30 includes a frame separate block 12 that separates the original video frames 40 into a series of odd video frames 50 and a series of even video frames 52. For example, if the original video frames 40 are a series of $frame_1$, $frame_2$, $frame_3$, $frame_4$, $frame_5$, $frame_6$, etc., then the odd video frames 50 are a series of $frame_1$, $frame_3$, $frame_5$, etc. and the even video frames 52 are a series of $frame_2$, $frame_4$, $frame_6$, etc. In some embodiments, the frame separate block 12 performs pre-processing such as temporal low-pass filtering or noise reduction before extracting the frames for each stream.

The sender 30 includes an encode block 14 that generates the encoded odd frames 54 in response to the odd video frames 50. The encoded odd frames 54 include I-frames and P-frames. In response to the example series $frame_1$, $frame_3$, $frame_5$, etc., the encode block 14 may generate an I-frame $I_1$, followed by P-frames $P_3$, $P_5$, etc. $P_3$ depends on $I_1$, and $P_5$ depends on $P_3$, etc.

Similarly, the sender 30 includes an encode block 16 that generates the encoded even frames 56 in response to the even video frames 52. In response to the example series frame$_2$, frame$_4$, frame$_6$, etc., the encode block 14 may generate an I-frame I$_2$, followed by P-frames P$_4$, P$_6$, etc. P$_4$ depends on I$_2$ and P$_6$ depends on P$_4$, etc.

Alternatively, in response to the example series frame$_1$, frame$_3$, frame$_5$, etc. the encode block 14 may generate I$_1$, P$_3$, P$_5$, etc, and in response to the example series frame$_2$, frame$_4$, frame$_6$, etc. the encode block 16 may generate P$_2$, P$_4$, P$_6$, etc, where P$_3$ depends on I$_1$, and P$_5$ depends on P$_3$, etc., and where P$_2$ depends on I$_1$, and P$_4$ depends on P$_2$ and P$_6$ depends on P$_4$, etc.

In another alternative, the I-frames in the encoded odd and even frames 54 and 56 may be offset with respect to one another. For example, the encode block 14 may generate I$_1$, P$_3$, P$_5$, etc, and the encode block 14 may generate P$_2$, P$_4$, P$_6$, I$_8$, P$_{10}$, P$_{12}$, etc, where P$_3$ depends on I$_1$, and P$_5$ depends on P$_3$, etc. and where P$_2$ depends on I$_1$ and P$_4$ depends on P$_2$ and P$_6$ depends on P$_4$ and P$_{10}$ depends on I$_8$, etc. In such an alternative, it may be preferable that the I-frames in the encoded even frames 56 be evenly spaced between the I-frames in the encoded odd frames 54 and visa versa.

The communication block 18 carries the streams of encoded odd and even frames 54 and 56 to the receiver 32. It is preferable that the streams of encoded odd and even frames 54 and 56 be carried in separate channels or communication paths so that disruptions that cause errors in the transmission of one of the streams do not hinder the transmission of the other. For example, if the communication block 18 is implemented as a packetized communication network then the stream of encoded odd frames 54 should be sent in packets that are separate from the packets that carry the stream of encoded even frames 56. As another example, if the communication block 18 is implemented as a radio frequency network then the stream of encoded odd frames 54 should be transmitted in a frequency band that is different from the frequency band that carries the stream of encoded even frames 56.

The receiver 32 includes a decode block 20 that generates a series of reconstructed even video frames 60 in response to the encoded even frames 56. The receiver 32 also includes a decode block 22 that generates a series of reconstructed odd video frames 62 in response to the encoded odd frames 54. The decoding method implemented in the decode block 20 is adapted to the encoding method in the encode block 16. Similarly, the decoding method implemented in the decode block 22 is adapted to the encoding method in the encode block 14.

For example, if the encode block 16 generates P-frames in the encoded even frames 56 that carry motion estimation and error information according to a prediction loop, then the decode block 20 uses the motion estimation and error information from the received P-frames in its own prediction loop to generate the reconstructed even video frames 60. The motion estimation parameters and error information parameters may be defined in a video compression standard. Examples of these standards are numerous and include the various motion picture engineering group (MPEG) standards such as MPEG-1, MPEG-2, MPEG-4, as well as H.261, and H.263.

In such embodiments, the prediction loops in the encode blocks 14–16 and the decode blocks 20–22 continually update their states with each encoded frame generated or received. For example, the prediction loop in the encode block 14 updates its state for each encoded odd frame 54 it generates and the decode block 22 updates its state after decoding the odd frames 54. Each prediction loop contains information which may be referred to as its state. The state of a prediction loop is used to form the prediction of the current frame to be encoded. One component of the state is the previous coded frame. The state varies with each encoded frame.

Each encode block 14–16 has a prediction loop with its own state. Each encode block 14–16 forms a prediction based on its state and codes and transmits the error signal along with side information such as motion vectors and inter/intra decisions for each block. This information describes how to form a prediction from the state. Each decode block 20–22 forms a prediction based on its state and the side information and then adds the received decoded error signal to reconstruct the current frame. The encode/decode block pairs 14/22 and 16/20 should have the same state. Otherwise their predictions will differ and they will lose tracking and may produce significant visual degradations in the reconstructed video frames 44.

Prior video compression methods usually have a single prediction loop at the sender and the receiver with a single state or other information which if lost results in different predictions in the sender and receiver, thereby often leading to significant visual degradations. The present techniques use multiple prediction loops each with its own state information. Therefore, the current teachings may be characterized as video communication using multiple state streams and the streams 54–56 may each be referred to as a state stream.

The receiver 32 includes a merge block 24 that combines the reconstructed even and odd video frames 60–62 into a series of reconstructed video frames 44 in the proper frame order. For example, the merge block 24 combines the reconstructed odd video frames 62 that include the reconstructed full frames frame$_1$, frame$_3$, frame$_5$, etc., with the reconstructed even video frames 60 that include the reconstructed full frames frame$_2$, frame$_4$, frame$_6$, etc. to provide the reconstructed video frames 44 which include the full frames frame$_1$, frame$_2$, frame$_3$, frame$_4$, frame$_5$, frame$_6$, etc. The reconstructed video frames 44 may be provided to a real-time display (not shown).

The merge block 24 may also perform post-processing such as known processing for artifact reduction or temporal filtering across the streams 54–56 to reduce distortions in each stream 54–56 and/or produce uniform quality-across the streams or temporal frame-rate conversion.

Figure 2:
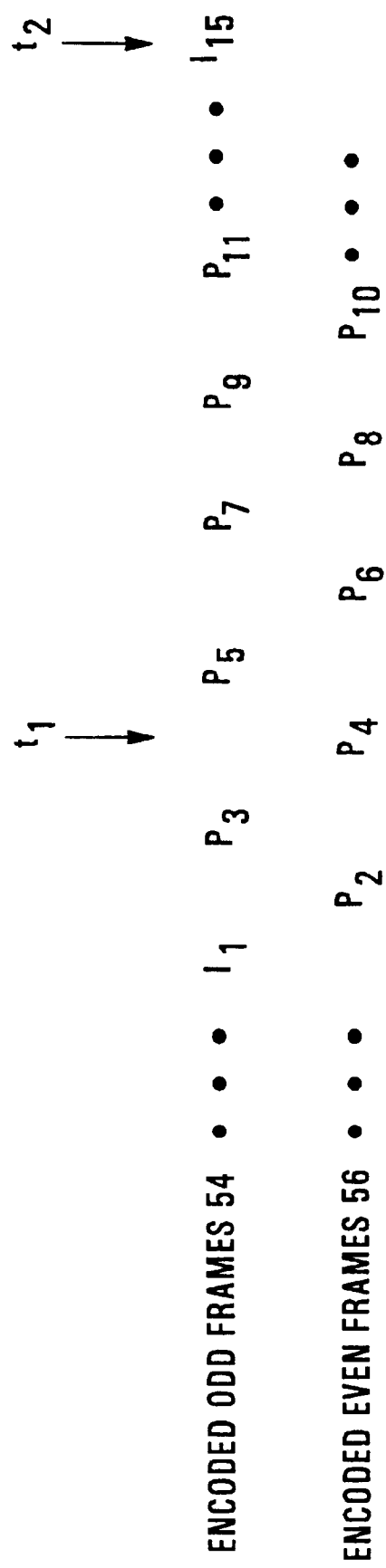
FIG. 2 illustrates the advantages yielded by the separate streams when an error occurs in transmission of one of the streams.

FIG. 2 illustrates the advantages yielded by the separate streams 54 and 56 when an error occurs during transmission between the sender 30 and the receiver 32. In this example, P$_3$ depends on I$_1$, and P$_5$ depends on P$_3$, etc., and P$_2$ depends on I$_1$, and P$_4$ depends on P$_2$ and P$_6$ depends on P$_4$, etc.

At time t$_1$, an error that occurs in the transmission of the encoded odd frames 54 prevents the decode block 22 from properly reconstructing P$_5$. In terms of a prediction loop, the decode block 22 cannot accurately decode frame P$_5$ and therefore has incorrect state as compared to the encode block 14. As a consequence, the decode block 22 cannot reconstruct P$_5$ through P$_{13}$ which are successively dependent on one another. The state for the decode block 22 is not reinitialized, in this example, until the I-frame I$_{15}$ is received at time t$_2$.

Between times t$_1$ and t$_2$, the decode block 20 continues to update its state with information carried by P$_4$, P$_6$, P$_8$, etc. and is unaffected by the loss of P$_5$. As a consequence, the reconstructed video frames 44 carry the reconstructed even video frames 60 between times t$_1$ and t$_2$. This provides a display at one half the normal frame rate of the original video frames 40. This provides a better video image than prior systems which would freeze the video or which would perform error concealment between times $t_1$ and $t_2$.

In an embodiment having three separate streams, a loss of an I-frame or a P-frame in one of the streams yields a frame rate of two-thirds the normal rate. An embodiment having four separate streams yields a frame rate of three-fourths the normal rate upon a loss of a P-frame in one of the streams, etc.

Figure 3:
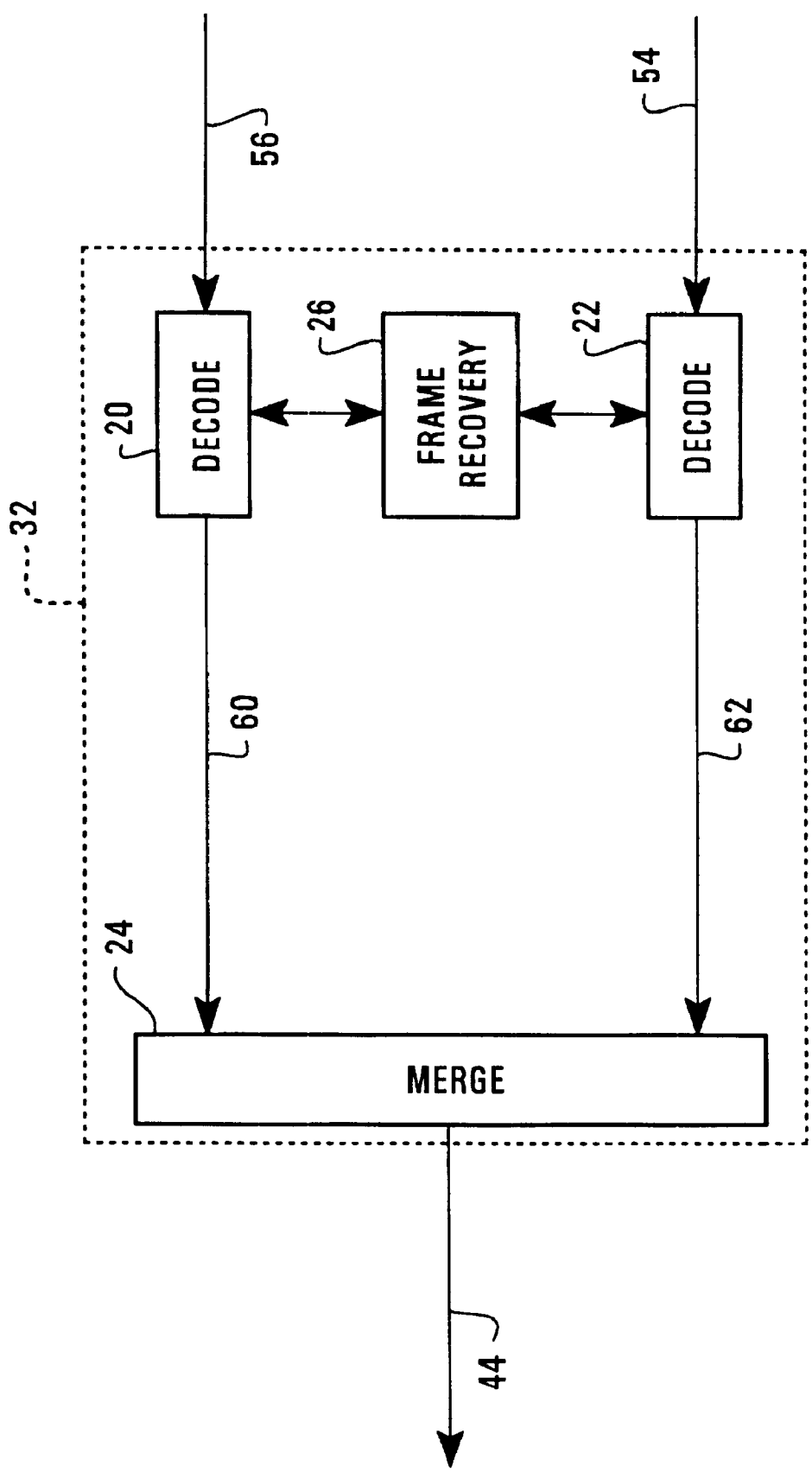
FIG. 3 illustrates an embodiment of a receiver which includes a frame recovery.

FIG. 3 illustrates an embodiment of the receiver 32 which includes a frame recovery block 26. The frame recovery block 26 recovers the lost P-frame $P_5$ of the stream 54 using the information provided by the stream 56. The recovery of $P_5$ enables the decode block 22 to continue with its prediction loop by correctly updating its state information and reconstruct $P_7$ through $P_{13}$. The fact that the reconstruction of the stream 56 is unaffected by the loss of $P_5$ enables the frame recovery block 26 to use past and future frames with respect to the lost frame $P_5$ to recover frame $P_5$. The past frames $P_2$ and $P_4$ and the future frames $P_6$ through $P_{14}$ are available to the frame recovery block 26 as well as $P_1$ and $P_3$ from the odd stream 54. Any accurately decoded frame from any of the streams 54–56 may be used by the frame recovery block 26. For example, all previous even and odd frames in the streams 54 and 56 as well as future even frames in the stream 56.

For example, the frame recovery block 26 may recover the full frame version of $P_5$ by averaging frame$_4$ and frame$_6$ which are the reconstructed full frame versions of $P_4$ and $P_6$. The reconstructed full frames frame$_4$ and frame$_6$ are generated by the decode block 20 as part of the reconstructed even video frames 60. The frame recovery block 26 may average any combination of the reconstructed versions of $P_2$, $P_4$, and $P_6$ through $P_{14}$ as well as $P_1$ and $P_3$. Such averaging may be appropriate when the video image carried in the streams 42 is static or slowly moving.

Alternatively, the frame recovery block 26 may recover the full frame version of $P_5$ by interpolating or estimating the full frame version of $P_5$ using any combination of the reconstructed full frame versions of $P_2$, $P_4$, and $P_6$ through $P_{14}$ as well as $P_1$ and $P_3$. Numerous motion estimation methods may be used to estimate the motion between the frames including block-based methods, constraint equation methods, pel-recursive methods, phase-correlation methods, Bayesian methods, and object-based methods. The full frame version of $P_5$ may be estimated by performing motion-compensated interpolation using motion estimates and by applying appropriate linear or nonlinear filtering along the motion trajectories. The interpolation may also account for covered and uncovered areas within the frame by appropriately choosing to use only future or previous frames to estimate the appropriate areas.

In another alternative, the frame recovery block 26 may recover the full frame version of $P_5$ by interpolating or estimating the full frame version of $P_5$ using the motion vectors contained in any combination of the P-frames $P_2$, $P_4$, and $P_6$ through $P_{14}$ as well as $P_1$ and $P_3$. In addition, other coded information from these past and future I-frames and P-frames may be used. The use of coded information in the bit-stream may help reduce the complexity of state recovery in the receiver 32.

The streams 54–56 my be coded in a coordinated manner so that if one is lost the coded information in the other is useful for recovering the lost sequence. For example, motion vectors for the stream 54 may be computed while accounting for the stream 56 so that if the stream 56 is lost the motion vectors from the stream 54 may be used to enable accurate recovery.

State recovery may be performed using any subset of correctly decoded frames. The lost frame may be estimated by replacing it by another correctly decoded frame, by replacing it by a motion-compensated version of a correctly decoded frame, or by replacing it via motion-compensated interpolation.

The encode blocks 14–16 may send side information to the decode blocks 20–22 for each frame in the streams 54–56 that informs the frame recovery block 26 of how to perform state recovery if the corresponding frame is lost.

Known error concealment methods may be applied using both previous and future frames to produce improved concealment of the lost frame.

In an embodiment in which the streams 54-56 include bidirectionally predicted frames (B-frames), the frame recovery block 26 may optionally recover and display lost B-frames. This is optional since no other frames depend on a lost B-frame.

Figure 4:
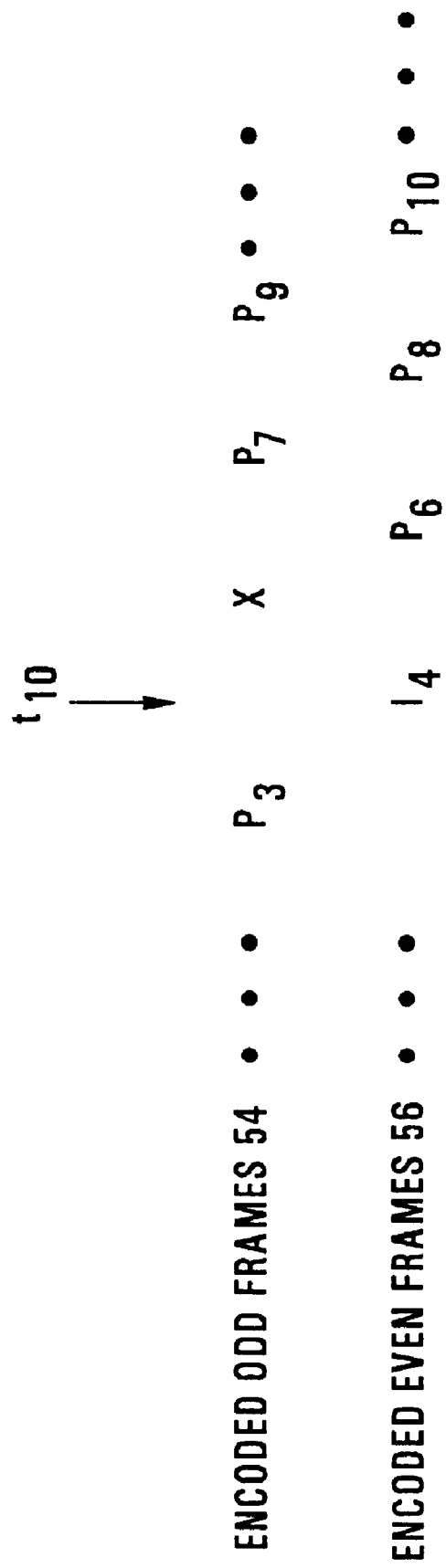
FIG. 4 illustrates an example in which past and future frames are selected for use in recovering a lost frame.

FIG. 4 illustrates an example in which the frame recovery block 26 selects past and future frames to be used in recovering a lost frame while taking into account scene changes. In this example, a communication error at time $t_{10}$ causes the loss of the encoded version of frame$_5$ from the encoded odd frames 54. Since frame3 is a P-frame and frame 4 is an I-frame, it is concluded that a scene change may have occurred between frame3 and frame4 and that therefore the lost frame5 was coded by the encode block 14 as an I-frame to accommodate the scene change. The frame recovery block 26 selects any combination of the reconstructed versions of $I_4$, $P_6$, $P_8$, etc. to be used in the recovery of frame$_5$ but not $P_2$ or $P_3$ because they were probably associated with a previous scene.

This method may also be used in instances where there is a P-frame for which most of its blocks are coded as I-blocks as opposed to P-blocks. For example, if $P_3$ corresponds to a typical P-frame where most of its blocks are coded as P-blocks and frame$_4$ is also a P-frame but it has a significant percentage of its blocks codes as I-blocks, then this indicates that there is significant new imagery in the I-block parts of frame$_4$ and that that information, rather than corresponding areas of $P_3$ should be used for recovering frame$_5$. A P-frame may have I-blocks when those blocks cannot be accurately predicted from the previous frame, for example when there is significant motion in a part of frame or there is new imagery in part of the frame.

In some embodiments, a communication channel exists that enables the receiver 32 to transmit information back to the sender 30. Such a communication channel is often called a back channel. In such embodiments, the frame recovery block 26 uses the back channel to notify the sender 30 that an error caused the loss of frame$_5$. The back channel may be used by the receiver 32 to inform the sender 30 as to the method used in frame recovery. While the frame recovery block 26 recovers frame$_5$ using selected past and future frames as described above, the sender 30 uses those same past and future frames and recovery method to determine the recovered frame$_5$. The sender 30 then compares the recovered frame$_5$ to the actual frame$_5$ that was previously encoded and transmitted to determine the quality of recovery performed by the frame recovery block 26. If the quality of recovery is not sufficient then the sender 30 encodes and transmits an I-frame in the encoded odd frames 54 to reinitialize the state of the decode block 22. In an alternative to sending an entire I-frame, the sender 30 may determine which sub areas of the recovered frame$_5$ are poor and send a frame that is intra for those areas and predictive for the remaining areas. The encoder may choose to replace its state with the recovered frame and then continue to code and form predictions in a known manner.

The blocks 12–26 each represent hardware and/or software elements for performing their particular functions. For example, the frame separate block 12 may be implemented with a hardware multiplexor circuit or may be implemented with equivalent functionality in software/firmware for a processor in the sender 30. The merge block 24 may be implemented with a hardware demultiplexor or equivalent software/firmware for a processor in the receiver 32. The encode blocks 14 and 16 may be implemented with separate hardware encoders, or with software/firmware executed by a processor in the sender 30, or with a combination thereof. The decode blocks 20–22 my be similarly implemented. The functionality of the frame recovery block 26 may be implemented in the hardware and/or software of the decode blocks 20–22 or in separate hardware and/or software/firmware.

The implementation of the communication block 18 includes hardware and/or software/firmware elements that are adapted to the type of communication employed in the video communication system 10. For example, if the video communication system 10 uses Internet communication, then the communication block 18 includes the hardware elements in the sender 30 and the receiver 32 for Internet access as well as software elements for implementing Internet communication protocols in the sender 30 and the receiver 32. In another example, if the video communication system 10 uses wireless communication, then the communication block 18 includes the hardware elements in the sender 30 and the receiver 32 for wireless transmission as well as software/firmware elements for implementing wireless communication protocols such as cellular in the sender 30 and the receiver 32.

Figure 5:
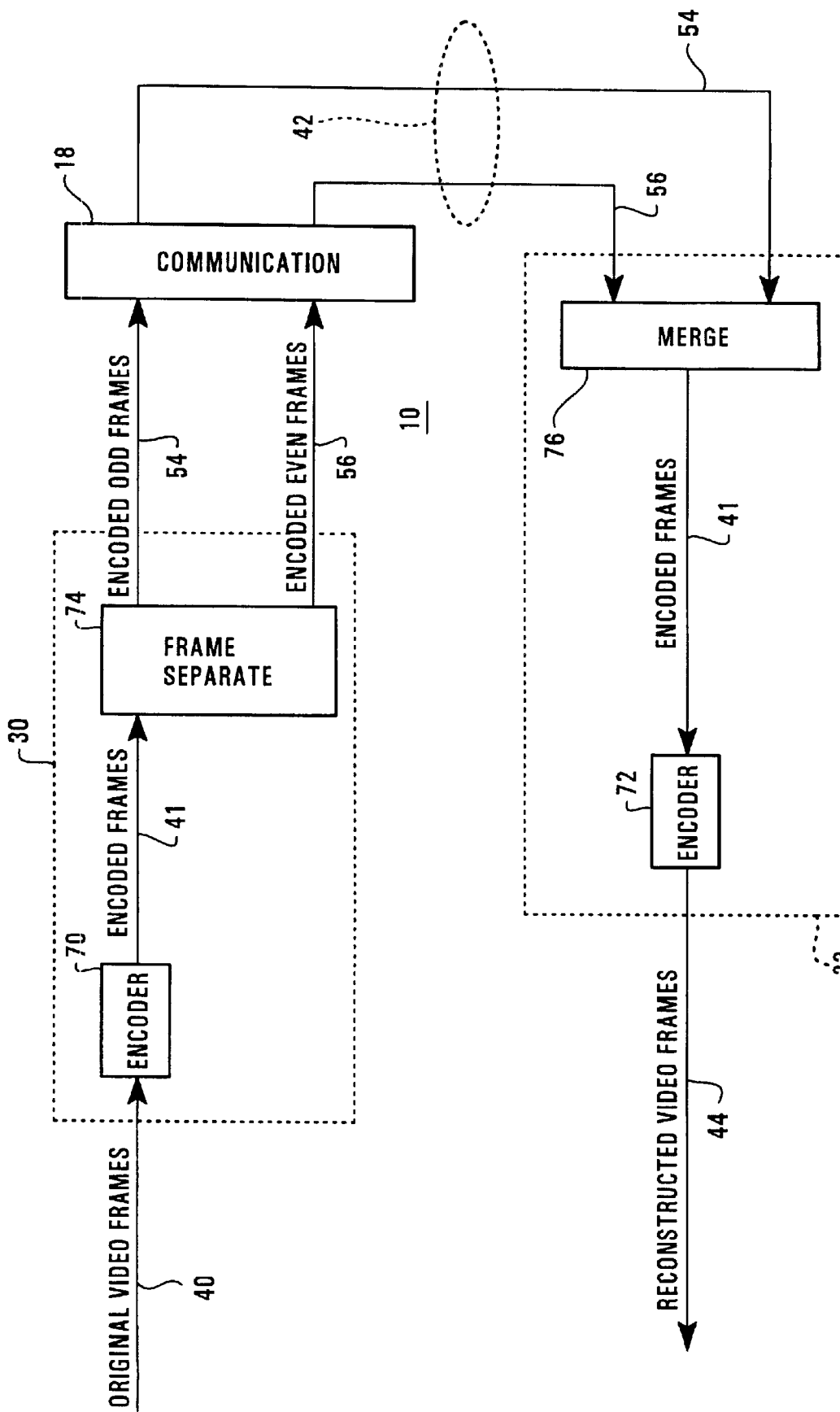
FIG. 5 shows another embodiment of a video communication system according to the present teachings.

FIG. 5 shows another embodiment of the video communication system 10 in which the sender 30 uses a single encoder 70 and in which the receiver 32 uses a single decoder 72 to handle the multiple streams 42. In response to the original video frames 40, the encoder 70 generates a series of encoded frames 41 that carry encoded versions of the original video frames 40. A frame separate block 74 in the sender 30 separates the encoded frames 41 into the multiple streams 42 which are the encoded odd and even frames 54 and 56. A merge block 76 in the receiver 32 reassembles in proper order the series of encoded frames 41 from the multiple streams 42. The decoder 72 generates the reconstructed video frames 44 and may perform frame recovery as previously described.

This embodiment saves hardware in the sender 30 and the receiver 32 in comparison to an embodiment in which separate encoder/decoder pairs are used for each of the streams 42. This embodiment is suitable for encoding and decoding according to compression standards in which any given encoded frame in the series of encoded frames 41 can depend on any other preceding frame in the series of encoded frames 41. This allows $P_8$ to depend on $P_6$ which depends on $P_4$, etc.

Other embodiments may employ more that two streams. For example, a set of three streams may carry every encoded third frame of the original video frames 40 or a set of four streams may carry every fourth encoded frame of the original video frames 40, etc.

Still other embodiments may employ streams made up of subsets of frames which are not uniform. For example, the stream 54 may contain $frame_1$, $frame_2$, $frame_4$, $frame_5$, $frame_7$, $frame_8$, and the stream 56 may contain $frame_3$, $frame_6$, $frame_9$, etc. The streams 54–56 may also contain fields. For example, one of the streams 54–56 may contain even fields and the other of the streams 54–56 may contain odd fields. Some frames may also be coded into more than one stream.

In still other embodiments, the separation of frames among the streams 54–56 may be determined dynamically based on the content of the original video frames 40.

The present techniques may be applied to subsets of the original video frames 40. For example, each of the original video frames 40 may be decomposed into four quadrants and each quadrant may be coded using two or more separate streams.

In addition, the number of multiple streams may be chosen adaptively and may be changed dynamically based on the communication conditions. For example, when the communication is very good and there are very few losses it may be appropriate to have two streams or only a single stream. If the communication becomes worse with many losses it may be appropriate to change the number of streams to three or four. The receiver 32 may notify the sender 30 of communication losses using, for example, a back channel. If communication losses are relatively low then the frame separate block 12 may send the original video frames 40 to one of the encode blocks 14–16. If communication losses are relatively high then the frame separate block 12 divides the original video frames among the encode blocks 14–16. Similar functionality may be implemented in the frame separate block 74 to adapt to changing communication conditions.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A video communication system, comprising:
   sender having means for generating multiple encoded streams in response to a stream of video frames each encoded stream having a series of encoded frames that depend from a previous encoded frame in the corresponding encoded stream;
   receiver having means for reconstructing the stream of video frames in response to the multiple encoded streams such that errors in one or more of the multiple encoded streams do not prevent reconstruction of remaining ones of the multiple encoded streams.

2. The video communication system of claim 1, wherein the means for generating multiple encoded streams comprises:
   a set of encoders each corresponding to one of the multiple encoded streams;
   means for separating the stream of video frames into a stream of video frames for each encoder.

3. The video communication system of claim 2, wherein the means for reconstructing the stream of video frames comprises:
   a set of decoders each for generating a stream of reconstructed video frames in response to one of the multiple encoded streams;
   means for merging the streams of reconstructed video frames.

4. The video communication system of claim 1, wherein the receiver further comprises means for recovering a frame lost from one of the multiple encoded streams using one or more decoded frames from remaining ones of the multiple encoded streams.

5. The video communication system of claim 1, wherein the receiver further comprises means for estimating a frame lost from one of the multiple encoded streams using one or more decoded frames from remaining ones of the multiple encoded streams.

6. The video communication system of claim 1, wherein the means for generating multiple encoded streams comprises means for decomposing each video frame into a set of quadrants and means for generating multiple streams for each quadrant.

7. The video communication system of claim 1, wherein the means for generating multiple encoded streams comprises means for adapting the number of the multiple encoded streams to communication conditions between the sender and the receiver.

8. The video communication system of claim 1, wherein the sender further comprises means for recovering a frame lost from one of the multiple encoded streams using one or more decoded frames from remaining ones of the multiple encoded streams.

9. The video communication system of claim 8, wherein the sender further comprises means for encoding the multiple encoded streams in response to the recovered lost frame.

10. A method for video communication, comprising the steps of:

generating multiple encoded streams in response to a stream of video frames each encoded stream having a series of encoded frames that depend from a previous encoded frame in the corresponding encoded stream;

reconstructing the stream of video frames in response to the multiple encoded streams such that errors in one or more of the multiple encoded streams do not prevent reconstruction of remaining ones of the multiple encoded streams.

11. The method of claim 10, wherein the step of generating multiple encoded streams comprises the steps of:

separating the stream of video frames into a stream of video frames for each encoded stream;

encoding each stream of video frames separately.

12. The method of claim 11, wherein the step of reconstructing the stream of video frames comprises the steps of:

generating a stream of reconstructed video frames in response to each of the multiple encoded streams;

merging the streams of reconstructed video frames.

13. The method of claim 10, further comprising the step of recovering a frame lost from one of the multiple encoded streams using one or more decoded frames from remaining ones of the multiple encoded streams.

14. The method of claim 10, further comprising the step of estimating a frame lost from one of the multiple encoded streams using one or more decoded frames from remaining ones of the multiple encoded streams.

15. The method of claim 10, wherein the step of generating multiple encoded streams comprises the steps of decomposing each video frame into a set of quadrants and generating multiple streams for each quadrant.

16. The method of claim 10, wherein the step of generating multiple encoded streams comprises the step of adapting the number of the multiple encoded streams to communication conditions between a sender and a receiver.

17. The method of claim 10, wherein the step of generating multiple encoded streams comprises the steps of determining a recovered frame lost from one of the multiple encoded streams using one or more decoded frames from remaining ones of the multiple encoded streams and encoding the multiple encoded streams in response to the recovered lost frame.

* * * * *